United States Patent [19]
Sourgen et al.

[11] Patent Number: 5,361,341
[45] Date of Patent: Nov. 1, 1994

[54] DEVICE FOR ENABLING THE USE OF THE CONTENTS OF MEMORY AREAS OF AN ELECTRONIC MICROPROCESSOR SYSTEM

[75] Inventors: Laurent Sourgen; Rodolphe Uhlmann, both of Aix en Provence, France

[73] Assignee: SGS-Thomson Microelectronics, S.A., Gentilly, France

[21] Appl. No.: 16,012

[22] Filed: Feb. 10, 1993

Related U.S. Application Data

[63] Continuation of Ser. No. 490,615, Mar. 22, 1990, abandoned.

[30] Foreign Application Priority Data

Oct. 2, 1987 [FR] France ............................ 87 13936

[51] Int. Cl.⁵ ............................................. G06F 12/14
[52] U.S. Cl. ............................ 395/425; 364/DIG. 1;
364/246.7; 365/195; 365/228
[58] Field of Search ... 364/200 MS File, 900 MS File,
364/195, 189.09, 228; 395/400 MS File, 425
MS File

[56] References Cited
U.S. PATENT DOCUMENTS

| | | | |
|---|---|---|---|
| 4,037,214 | 7/1977 | Birney et al. | 364/200 |
| 4,038,645 | 7/1977 | Birney et al. | 364/200 |
| 4,388,695 | 6/1983 | Heinemann | 395/425 |
| 4,390,968 | 6/1983 | Hennessy et al. | 364/900 |
| 4,442,484 | 4/1984 | Childs, Jr. et al. | 364/200 |
| 4,513,389 | 4/1984 | Devchoudhury | 364/900 |
| 4,521,853 | 6/1985 | Guttag | 364/200 |
| 4,682,283 | 7/1987 | Robb | 395/400 |
| 4,713,753 | 12/1987 | Boebert et al. | 395/425 |
| 4,839,628 | 6/1989 | Davis et al. | 340/311.1 |

*Primary Examiner*—Joseph L. Dixon
*Assistant Examiner*—Reba I. Elmore
*Attorney, Agent, or Firm*—Robert Groover

[57] ABSTRACT

A decision circuit receives input addresses of instructions to be executed and data addresses to which the instructions are to be applied. The decision circuit either allows the execution of the instruction or prohibits the execution of the instruction if the instruction leads to a false operation or to a fraudulent attempt to divulge the system contents. A buffer register stores the instruction addresses and subsequently presents them to the decision circuit simultaneously with the data addresses. This device applies particularly to the protection of electronic integrated circuit memory cards.

26 Claims, 2 Drawing Sheets

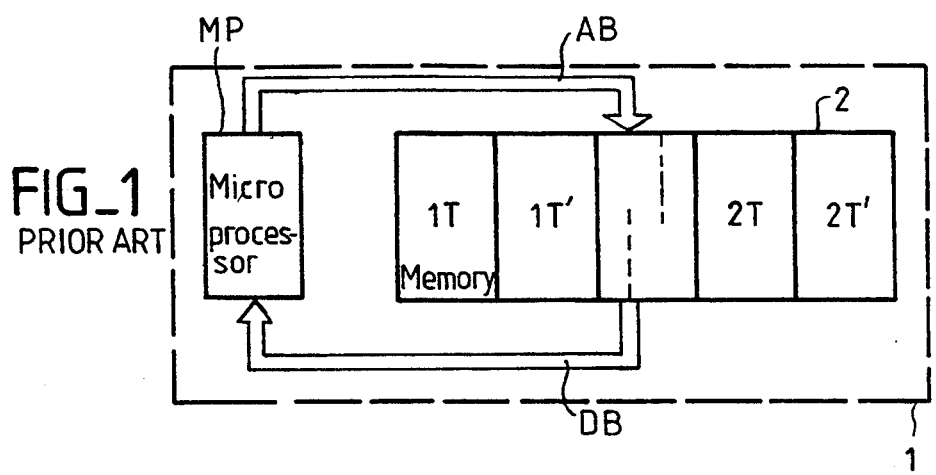
FIG_1 PRIOR ART
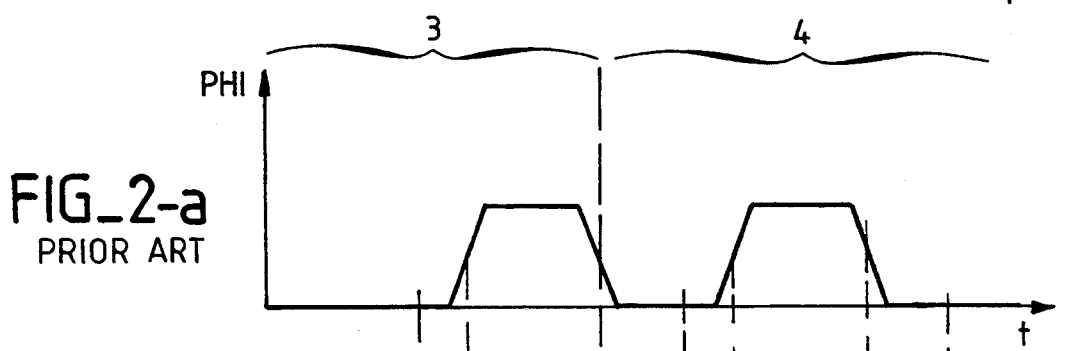
FIG_2-a PRIOR ART
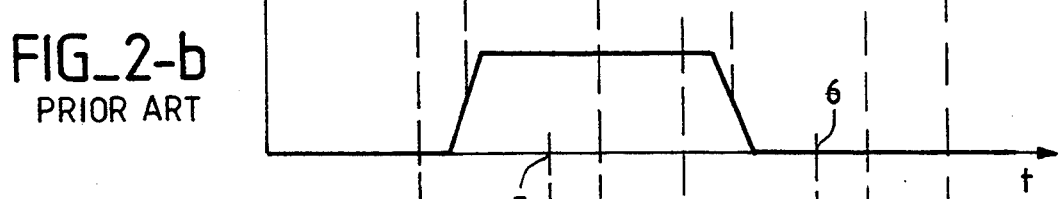
FIG_2-b PRIOR ART
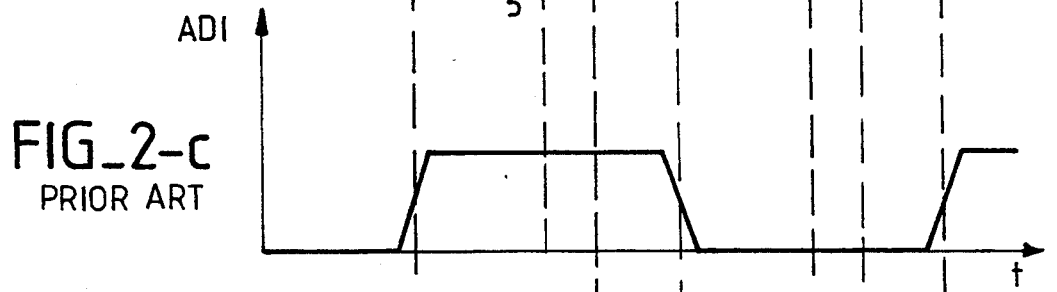
FIG_2-c PRIOR ART
FIG_2-d PRIOR ART

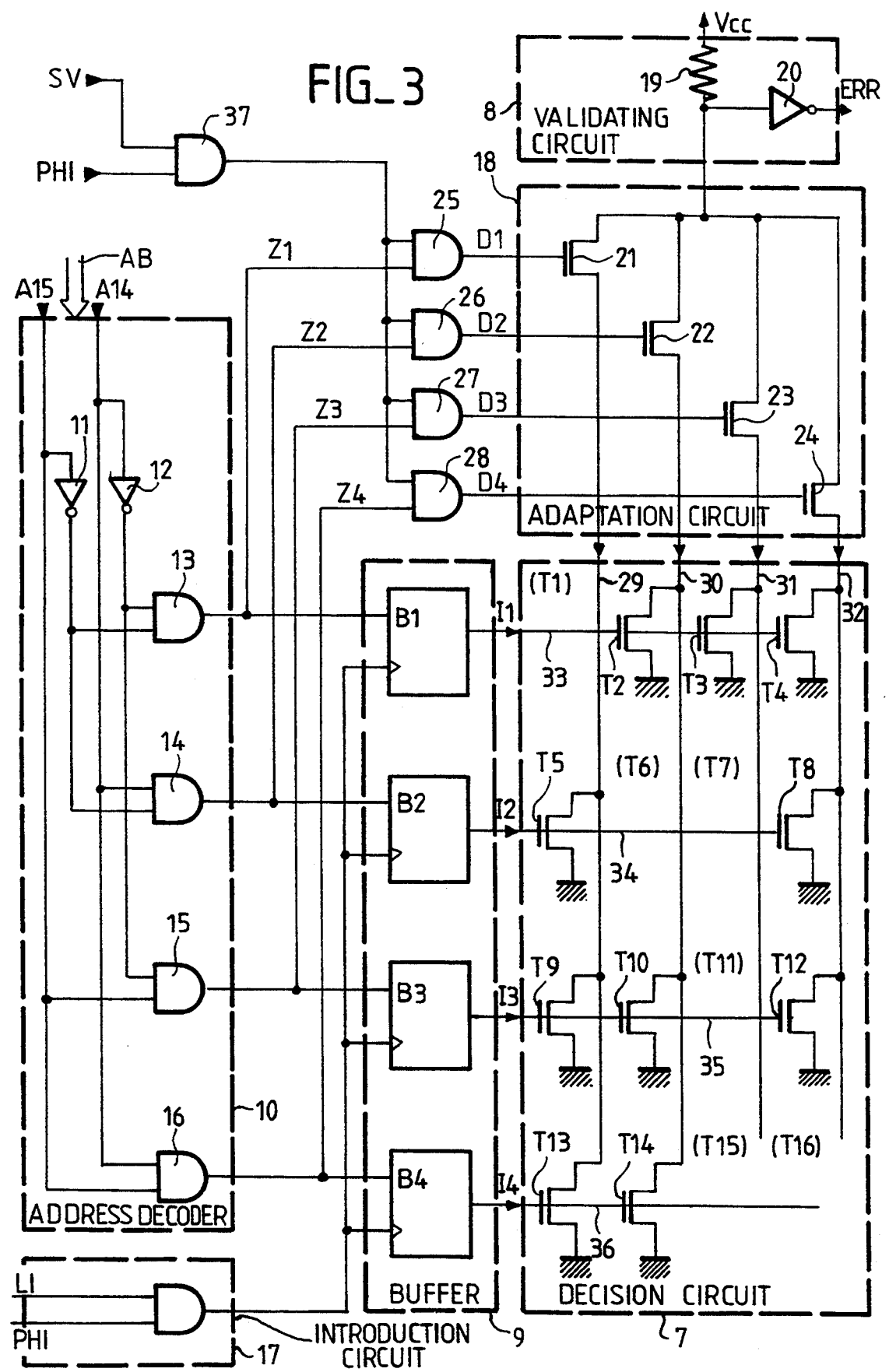

DEVICE FOR ENABLING THE USE OF THE CONTENTS OF MEMORY AREAS OF AN ELECTRONIC MICROPROCESSOR SYSTEM

This application is a continuation, of application Ser. No. 07/490,615, filed Mar. 22, 1990 now abandoned.

BACKGROUND AND SUMMARY OF THE INVENTION

The present invention relates to the protection of the memory areas of an electronic microprocessor system. It generally concerns the field of computers and, more particularly, the field of memory cards, the storage element of which, inserted in a card, comprises an electronic integrated circuit managed by a microprocessor. The device of the invention can also be used in the field of the protection of software programs where, by astute programming, it can easily be made to prevent the duplication or printing of programs which are to be kept secret. It may also be aimed at preventing the annoying consequences of operating errors.

In electronic microprocessor systems, notably memory card applications of the computerised money type, it is necessary to restrict access to certain memory areas of the system. In particular, it is desirable to prevent any attempt at fraud through the reading of theoretically prohibited areas in these cards. This is the case, for example, with the areas containing the secret code for the use of the card. On the other hand, the memories of memory cards have other areas, especially those representing a balance, where it should be possible to modify the information stored. A situation is then faced wherein it should be possible or not possible to read different memory areas. In addition, another type of memory, instructions to be performed by the microprocessor may also be stored. In these areas the same dual situation is encountered where certain instructions may be left to the user while, on the contrary, he is forbidden the use of other instructions.

In a more complicated and more realistic situation, certain instructions are commonplace in themselves but become vital to the confidentiality of the system only if they are applied to certain types of data. For example, an editing instruction is not dangerous if it is applied, with certain precautions, to the editing of the balance of an account. By contrast, it becomes far more vitally important if it is applied to editing the secret code of transaction with the memory card in question. There are known approaches in the prior art where the execution of these prohibited actions is prevented by additional instructions which may be introduced into the system. Ultimately, a system such as this works with a software program in which certain instructions are designed to prevent the execution of the prohibited actions. However, just as it was possible to introduce these instructions, so it may be possible, with an additional software program, to neutralise these prohibitions. Furthermore, these prohibition complicate the system and may slow down the execution of the instructions that are allowed.

It is an object of the invention to overcome these drawbacks and to propose a simple device, which draws not on the software but rather on the hardware, and which when adders to the system neither complicates the use of this system nor slows down its working speed in any way. The principle of the invention lies in the construction of a decision matrix which receives for example, in real time, the instruction to be executed and the data on which these instructions are to be executed. The decision matrix prepares a signal for validating the operation of the system when the application of the instructions to the data in question may be authorised.

Preferentially, rather than taking the instructions and the pieces of data themselves into account, the decision matrix is capable of working on the addresses of the instructions and of the data concerned. This has the advantage that, when these secret codes are produced subsequently to the fabrication of the integrated circuit, the decision matrix may remain unchanged provided that these secret codes are stored at an address determined beforehand, irrespective of their content. Under these conditions, the decision matrix may be fabricated at the same time as the integrated circuit. This has two advantages: firstly, this matrix does not have to be programmed at a later time. Secondly, having been defined at the very start of the fabrication, it may benefit from all the technological protection systems that it is possible to give the other parts of the circuit.

An object of the invention, therefore, is a device for the protection of memory areas of an electronic microprocessor system, the memory areas being divided between areas of a first type and areas of a second type, characterised in that it comprises:
  a decision circuit receiving address signals relating to information stored in areas of the first type and of the second type;
  and a circuit to validate the working of the system as a function of a signal delivered by the decision circuit in response to the address signals that it receives.

The invention will be understood more clearly from the following description and from the examination of the Figures that accompany it. These are given purely by way of illustration and in no way restrict the scope of the invention.

BRIEF DESCRIPTION OF THE DRAWINGS

FIG. 1 is a block diagram an electronic microprocessor system to be protected;

FIGS. 2a to 2d are timing diagrams of logic signals useful for making the protection device of the invention work;

FIG. 3 is a schematic depiction of a protection device according to the invention.

DESCRIPTION OF THE PREFERRED EMBODIMENTS

FIG. 1 shows an electronic microprocessor system 1 provided with A microprocessor MP a memory 2 possessing memory areas of a first type, 1T, 1T'. . . and memory areas of a second type, 2T, 2T'. . . i.e., data bus DB and user address bus AB. These memory areas may belong to only one memory or to different memories. They may also belong to memories belonging to different technologies, for example static type memories, dynamic type memories or non volatile (EPROM or EEPROM) memories. They may also be memories with different functions, for example random-access memories or read-only memories. In practice, the areas of a first type may be areas where instructions are stored and the areas of a second type may be areas where items of data are stored. More generally, the areas of a first type or of a second type may even be areas where, in fact, addresses of instructions or of data are stored.

The microprocessor MP of the system 1 works as follows (FIGS. 2a to 2d) during a cycle 3 of a sequence for the execution of instructions, the microprocessor takes up an instruction from an area of a first type 1T or 1T'. During the following cycle 4, it takes up, from the data areas 2T, 2T', the data to which the previously extracted information should be applied. If necessary, the sequence of these cycles could be reversed without this resulting in a profound modification of the invention. In a preferred embodiment, the conveying of data between the memory and the microprocessor is done by a single bus DB the assigning of which to the reading of the areas of the different types of memory is laid down by an instructions reading signal LI. A signal PHI forms the clock of the system: it synchronises the different operations.

A microprocessor MP such as this typically works as follows (FIGS. 2a to 2d): during the first cycle 3, an address ADI of an instruction decoded by the decoder of the memory is applied over the bus AB to the memory. At a time 5 in the cycle 3, the content of this instruction is sent to the microprocessor. This dispatch is validated by the instructions reading command LI. During the next cycle 4, a data address ADD is applied over the bus AB to the memory, and the data contained in this address are transferred to the microprocessor at a time 6 for a reverse state of the signal LI.

FIG. 3 shows a device according to the invention. Through a decoder 10 connected, in parallel with other circuits, to receive high-order address bits A14 and A15, a decision circuit 7 receives decoded memory address signals Z1 through Z4. For the addresses of a first type area in the memory, namely those of the instructions, signals Z1 through Z4 may also be referred to as I1 through I4. Similarly, the address signals relating to the information stored in the memory areas of the second type, namely those of the data, may also be referred to as the signals D1 to D4. The device of the invention includes a circuit 8 to validate the working of the system as a function of a signal delivered by the decision circuit 7 in response to the address signals that this circuit has received.

Preferably, as seen earlier, the access to the information stored at addresses of different types of area is controlled by orientation signals. Here the orientation signal which has been described is the instructions reading signal LI. In the invention, a buffer register 9 is preferably used to receive, as a function of the state of the orientation signal, address signals relating to the pieces of information stored in the areas of the first type, in the instruction areas. During the cycle 3, the buffer register receives address signals I1 to I4. It keeps them until it receives a reset-to-zero command. The existence of this buffer register enables the use of only one decoder 10 to decode all the addresses of the pieces of information to be extracted at different periods during the sequence: during the cycle 3 or the cycle 4. When the cycle 4 is executed, the register 9 delivers the address signals I1 to I4 at output while the decoder 10 gives address signals D1 to D4. During the next cycle, which may be equivalent to a cycle of the intrinsic clock of the microprocessor, the validation circuit 8 may deliver an error signal ERR before the end of the execution, by the microprocessor, of the instruction that has been given to it for execution.

In a simple exemplary embodiment, the memory shall be considered to be divided into four areas: areas 1T, 1T', 2T, 2T'. Then, for addresses encoded on a certain number of bits, for example on sixteen bits, it is possible to use the two significant bits A14 and A15 to determine which areas of the memory are involved. For example, for the pair A15-A14 having a value of 0-0, the area 1T may be involved, for 0-1 it may be the area 1T', for 1-0 it may be the area 2T, and for 1-1 it may be the area 2T'. The decoder 10 which receives the address signals may convert these address bits, depending on the area concerned, into signals Z1, Z2, Z3 and Z4.

Depending on the cycle during which these signals are prepared, it may be assumed that they represent the address signals I1 to I4 of the instructions or address signals D1 to D4 of the data. The decoder 10 is of a standard type: it has, notably, for each input of the address bits taken into account, an inverter 11 or 12, and a set of four AND gates 13 to 16 to produce the signals Z1 to Z4 from the pair of address bits A14-A15. The buffer register 9 has four flip-flops B1 to B4, respectively receiving the signals Z1 to Z4, on the one hand, and a blocking and reset-to-zero signal, on the other hand. The blocking and reset-to-zero signals are delivered by a so-called introduction circuit 17. The circuit 17 enables the introduction, into the circuit 7, during the cycle 4, of the address signals I1 to I4, which were applied during the cycle 3 to the flip-flops B1 to B4 of the buffer register 9. The outputs of the flip-flops B1 to B4 are connected to four connections, 33 to 36 respectively.

In a first variant, this circuit works as follows: the addresses A14-A15 are decoded and produce the signals Z1 to Z4. At each cycle, only one of these signals Z1 to Z4 is at a level 1 while the other three are at 0. For example, if the decoded address corresponds to the area 1T, then Z1 will be at 1. During the cycle 4, the data signals D1 to D4 are transmitted to the decision circuit 7 by a matching circuit 18.

The matching circuit 18 is presented herein by way of illustration. It could have any other form, or it could even be not included in another embodiment of the device. In the example, the validation circuit 8 has a resistor 19 connected to the general supply of the electronic microprocessor system on the one hand and to the matching circuit 18 on the other hand. This resistor may be made according to a variety of technologies: it may be a diffused resistor, a polysilicon resistor or, again, a transistor mounted as a resistor at the limit of conduction. At the position where the resistor 19 is connected to the circuit 18, an inverter 20 taps an available voltage and delivers, at output, the validation signal ERR that is sought. The matching circuit 18 has a set of four transistors 21 to 24 connected, firstly, in common, to the resistor 19 and, secondly, by four connections 29 to 32, to each of the address inputs of the decision circuit 7. At their control gate, the transistors 21 to 24 respectively receive the signals D1 to D4 decoded by the decoder 10. A set of four AND gates 25 to 28 enables the transmission of these addresses to the decision circuit 7 when a signal PHI for the synchronisation of the reading of data permits it.

In one example, the decision circuit includes, at the intersection of the connections 29 to 32 and 33 to 36, transistors T1 to T6 connected as follows. The drains of these transistors are connected to the connections 29 to 32 respectively, the gates of these transistors are connected to the connections 33 to 36. At certain intersections, the transistors have not been made: they appear in brackets in FIG. 3. This is the case, for example, with the transistors T1, T6, T7, T11, T15 and T16.

The working of the device of the invention is as follows: when PHI is equal to zero, the transistors 21 to 24 are off, no current flows through the resistor 19 and the output ERR is law to one. During the first cycle 3, when the instructions reading signal LI and the clock signal PHI are both equal to one, the flip-flops B1 to B4 are open. One of the signals Z1 to Z4 flows through these flip-flops and gets positioned at one in a signal I1 to I4 depending on the selected area of the memory. This corresponds to the area of instruction which has to be executed. When the signal PHI returns to zero, the flip-flops go off and I1 to I4 retain their value until the next cycle where LI and PHI are again equal to one. During the second cycle 4, when PHI again becomes equal to one, with LI at zero, the address signals Z1 to Z4 are converted into corresponding address signals D1 to D4.

In fact, only one of these signals Z1 to Z4 is equal to one, so that only one of the transistors 21 to 24 becomes conductive. Let us assume, for example, that the transistor 23 becomes conductive because the signal Z3 is equal to one: the piece of data to be taken up is in the memory area 2T. If the area 1T had been decoded as being the area of origin of the instruction during the cycle 3, the transistor T3 would become conductive during the cycle 4 and electrical current would flow through the resistor 19, from the transistor 23 and the transistor T3. Under these conditions, the voltage at input of the inverter 20 would drop and the signal ERR would rise to one, indicating an error. This error can be uses to prohibit the working of the system. On the contrary, if the area 1T' had been decoded as being an area of origin of the instruction during the preceding cycle 3, the absence of the transistor T7 would not have enabled this current to pass through the resistor 19. The signal ERR would remain at zero, and the operation of the system would have been permitted. Ultimately, by their presence or absence, the transistors T1 to T6 indicate a prohibition of access to a concerned area of the memory in combination with an access to another concerned area of the memory. The classification into areas of a first type and areas of a second type of the memory is, therefore, essentially related to the nature of instructions, data or even addresses that these areas are liable to contain. Naturally, they may be located geographically at intermingled positions in the memory.

The encoding is done, in the example described, by the physical presence of a transistor. The making of the decision circuit 7 can thus be obtained by masking: during the fabrication of the integrated circuit, a set of masks is used such that, at the position of this circuit, the necessary transistors are positioned. For certain applications, nonetheless, these transistors may be replaced by EPROM or EEPROM type memory cells which have the merit of being programmable and nonvolatile. The decision circuit 7 is thus a programmed read-only memory. This arrangement may be necessary when the integrated circuits fabricated have to be capable of being verified beforehand and/or programmed. It may then prove to be necessary, for the checking operation and for the programming operations performed by the manufacturer, to have access to memory areas which will subsequently be prohibited. In this case, it may be decided to make programmable transistors at all the points of intersection of the decision matrix. The programmable transistors are, for example, intermediate floating gate transistors of the EPROM or EEPROM type, or else random-access memory cells charged when the system is initialised. When the preliminary operations have been done on the circuit, it is possible, in the last resort, to program the decision circuit, the effect of which may be to irrevocably prohibit the execution of certain instructions, including the subsequent programming of certain particular areas of the memory and, especially, including its own programming. Naturally, this simply described device may be extended to a greater number of areas, the sizes of which may or may not be equal.

It has been seen that, with the signal LI, it is possible to prohibit the execution of certain instructions which required the reading of the content of the memories. It has been seen that it is thus possible to prohibit the writing of certain memory areas. This may be obtained by using a signal SV corresponding, according to its level, to the writing or to the reading of the memory areas. It is possible, for example, to introduce this signal SV in common with the clock signal PHI in an AND gate 37 to validate, as the case may be, the transmission of the address data to the decision circuit, thus making it possible to obtain a different decision circuit depending on whether the instruction reads or writes a piece of data.

What is claimed is:

1. An integrated circuit memory address protection device, comprising:

a plurality of flip-flops connected to receive a respective plurality of decoded address lines, and having a clock input connected to receive a first signal;

a corresponding plurality of static gates which are also connected, in parallel to said flip-flops, to receive said respective plurality of decoded address lines, and connected to receive a second signal at an enable input, and configured and connected to drive a respective plurality of output lines in accordance with the state of said address lines and said second signal;

an validation circuit having an input connection, and configured to output an error signal whenever said input connection is driven toward a predetermined first voltage;

a plurality of pass transistors each connected to receive a respective one of said output lines of said static gates at a respective control terminal thereof, and each connected between said error-detection circuit and a respective one of a plurality of first connections; and a programmed array, including a plurality of first lines each connected to a respective output of one of said flip-flops, and a plurality of second lines each connected to a respective one of said first connections, and a plurality of transistors, at some BUT NOT ALL intersections of said first and second lines, each having a respective control terminal connected to a respective one of said first lines, and each having respective current-conducting terminals connected to drive a respective one of said second lines toward said first voltage;

whereby the locations of transistors in said array determine which combinations of addresses will cause said validation circuit to produce an error signal.

2. The memory address protective device of claim 1, wherein said first voltage is ground voltage.

3. The memory address protective device of claim 1, wherein said static logic gates are AND gates.

4. The memory address protection device of claim 1, further comprising decoding logic connected to receive at least two high-order address bits and configured to generate said decoded address lines in accordance with said high-order address bits.

5. The memory address protection device of claim 1, wherein said validation circuit comprises an electrical load connected to drive the potential of said input connection away from said first voltage.

6. The memory address protection device of claim 1, wherein said decoded address lines correspond to high-order memory address bits.

7. The memory address protection device of claim 1, in combination with a microprocessor core which is connected to receive said error signal from said validation circuit.

8. The memory address protection device of claim 1, in combination with a memory which is also connected to receive said address bits, and a microprocessor which is connected to control access to said memory and is also connected to receive said error signal from said validation circuit.

9. An integrated circuit memory address protection device, comprising:
- a clocked buffer connected to receive a respective plurality of decoded address lines, and connected to receive a first signal at a clock input thereof;
- an validation circuit having an input connection, and configured to output an error signal whenever said input connection is driven toward a predetermined first voltage;
- a plurality of pass transistors each operatively connected to receive a respective one of said decoded address lines at a respective control terminal thereof, and each connected between said error-detection circuit and a respective one of a plurality of first connections; and
- a programmed array, including a plurality of first lines each connected to a respective output of said clocked buffer, and a plurality of second lines each connected to a respective one of said first connections, and a plurality of transistors, at some BUT NOT ALL intersections of said first and second lines, each having a respective control terminal connected to a respective one of said first lines, and having respective current-conducting terminals connected to drive a respective one of said second lines toward said first voltage;
- whereby the locations of transistors in said array determine which combinations of addresses will cause said validation circuit to produce an error signal.

10. The memory address protection device of claim 9, wherein said first voltage is ground voltage.

11. The memory address protection device of claim 9, further comprising logic gates connected to and interposed between said decoded address lines and said pass transistors.

12. The memory address protection device of claim 9, further comprising decoding logic connected to receive at least two high-order address bits and configured to generate said decoded address lines in accordance with said high-order address bits.

13. The memory address protection device of claim 9, wherein said validation circuit comprises an electrical load connected to drive the potential of said input connection away from said first voltage.

14. The memory address protection device of claim 9, wherein said clocked buffer comprises a plurality of flip-flops connected in parallel.

15. The memory address protection device of claim 9, wherein said decoded address lines correspond to high-order memory address bits.

16. The memory address protection device of claim 9, in combination with a microprocessor core which is connected to receive said error signal from said validation circuit.

17. The memory address protection device of claim 9, in combination with a memory which is also connected to receive said address bits, and a microprocessor which is connected to control access to said memory and is also connected to receive said error signal from said validation circuit.

18. An integrated circuit memory address protection device, comprising:
- a clocked buffer connected to receive a respective plurality of decoded address lines, and connected to receive a first signal at a clock input thereof;
- an validation circuit having an input connection, and configured to output an error signal whenever said input connection is driven toward a predetermined first voltage;
- a plurality of pass transistors each having a respective control terminal operatively connected to a respective one of said decoded address lines, and each connected between said error-detection circuit and a respective one of a plurality of first connections; and
- a programmed array, including a plurality of first lines each connected to a respective output of said clocked buffer, and a plurality of second lines each connected to a respective one of said first connections, and, at some BUT NOT ALL intersections of said first and second lines, connections such that said respective second line will be driven toward said first voltage whenever said respective first line is active.

19. The memory address protection device of claim 18, wherein said first voltage is ground voltage.

20. The memory address protection device of claim 18, further comprising logic gates connected to and interposed between said decoded address lines and said pass transistors.

21. The memory address protection device of claim 18, further comprising decoding logic connected to receive at least two high-order address bits and configured to generate said decoded address lines in accordance with said high-order address bits.

22. The memory address protection device of claim 18, wherein said validation circuit comprises an electrical load connected to drive the potential of said input connection away from said first voltage.

23. The memory address protection device of claim 18, wherein said decoded address line correspond to high-order memory address bits.

24. The memory address protection device of claim 18, wherein said clocked buffer comprises a plurality of flip-flops connected in parallel.

25. The memory address protection device of claim 18, in combination with a microprocessor core which is connected to receive said error signal from said validation circuit.

26. The memory address protection device of claim 18, in combination with a memory which is also connected to receive said address bits, and a microprocessor which is connected to control access to said memory and is also connected to receive said error signal from said validation circuit.

* * * * *